May 24, 1932. F. W. ROLLER 1,860,055
ELECTRICAL MEASURING INSTRUMENT
Filed Dec. 30, 1929
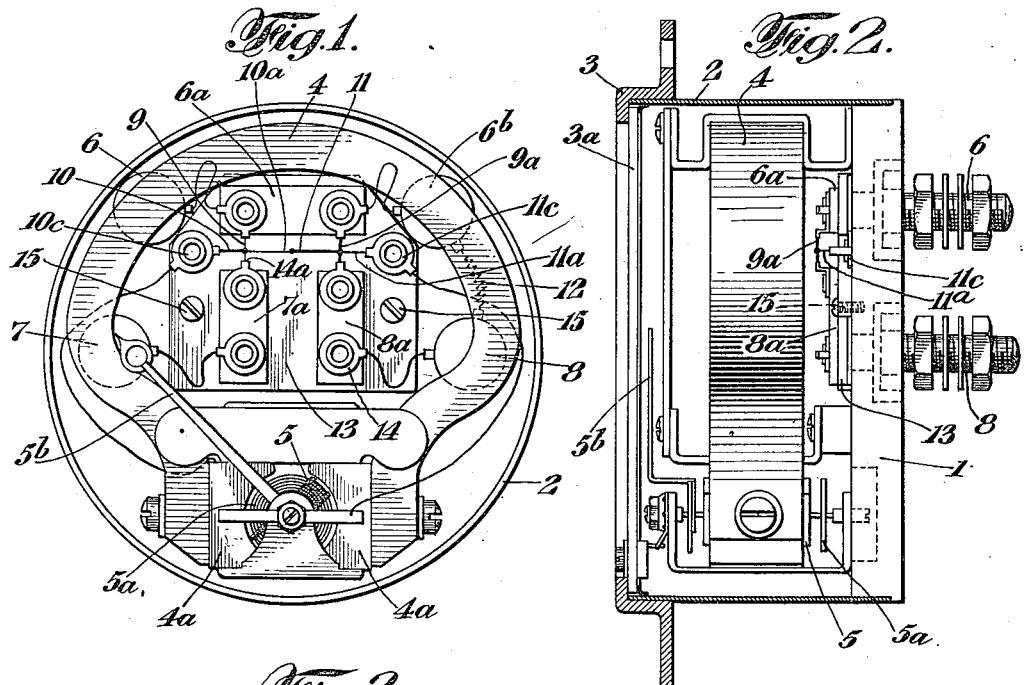
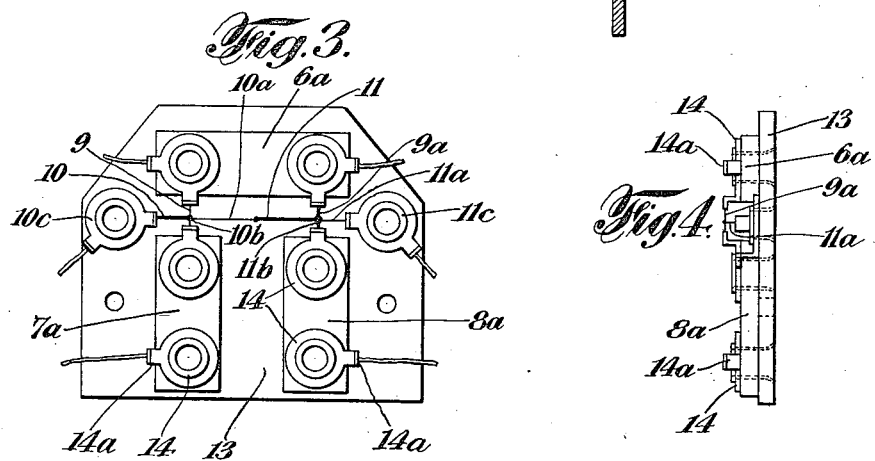
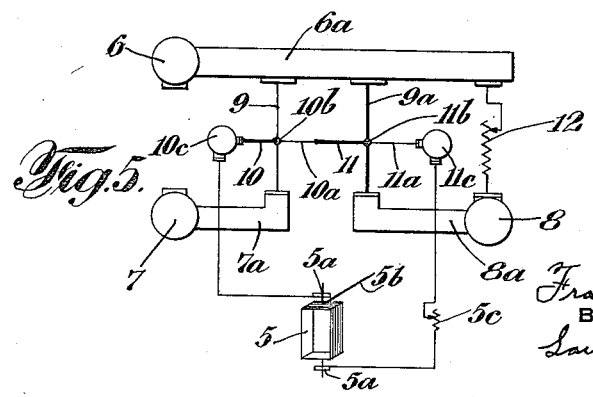
INVENTOR
Frank W. Roller
BY
Lawrence K. Sager
his ATTORNEY Patented May 24, 1932

1,860,055

UNITED STATES PATENT OFFICE

FRANK W. ROLLER, OF EAST ORANGE, NEW JERSEY, ASSIGNOR TO ROLLER-SMITH COMPANY, A CORPORATION OF NEW YORK

ELECTRICAL MEASURING INSTRUMENT

Application filed December 30, 1929. Serial No. 417,390.

This invention relates to instruments which are particularly adaptable for use in measuring alternating currents of high frequency, although the invention is also applicable for use in measuring alternating currents which do not have high frequencies, as well as to the measurement of direct currents.

The type of instrument to which this invention relates is one wherein a conductor is heated by the passage of the current therethrough and a thermo-electric couple is provided for securing an indication of the current to be measured.

One of the main objects is to provide an instrument of the above type which may have double range scale indications for convenience in measuring currents of comparatively high and low values with adequate deflection of the instrument indicator. Another object is to provide an improved form of construction whereby the thermocouple device or devices and heating conductor or conductors may be readily removed and replaced as a unit, giving convenient interchangeability of this unit without the necessity of disturbing or dissembling other parts of the instrument. Another object is to provide an instrument of this type which will have such a high degree of accuracy as to satisfactorily comply with the requirements in this regard. Another object is to provide a form of construction which may be conveniently and economically manufactured and assembled. Other objects and advantages will be understood from the following description and accompanying drawings, which illustrate a preferred embodiment of this invention.

Fig. 1 is a front view of the instrument, with the scale plate and front cover removed; Fig. 2 is a side view, partly in section; Fig. 3 is a front view of the removable unit; Fig. 4 is a side view thereof; and Fig. 5 is a diagram of connections.

Referring to Figs. 1 and 2, the indicating instrument is shown as having a base 1, a cylindrical casing 2 secured thereto and a front cover 3 having an outwardly extending flange for supporting the instrument on a panel. The cover 3 has an opening which is closed by a glass plate 3a. The indicating portion of the instrument may be of any suitable direct current type and is here shown as having a permanent magnet 4 of generally circular form, provided with pole pieces 4a, between which is located the pivotally supported movable coil 5, having the usual springs 5a for opposing the deflection of the movable element. The movable element carries, of course, the indicating needle or pointer 5b. The instrument as thus far described may be of any particular design or form of construction for giving a deflection of the indicating element upon being subjected to an electromotive force producing a direct current in the instrument.

Thermocouple instruments are well-known and include a conductor or strip which is heated by the passage of the current to be measured, and the thermocouple has its junction of the two dissimilar metals heated corresponding to the heating of the conductor or strip by the current to be measured. The electro-motive force generated by the thermocouple, when applied to a suitable direct current indicating instrument, will give a proper indication of the current to be measured passing through the heating conductor or strip. It is very desirable, particularly in the measurement of alternating currents, to provide a two-range instrument having a double scale, one for indicating the value of comparatively large currents, and the other for indicating the value of smaller currents, with a possible maximum deflection when measuring smaller currents, equal or approximately equal to the possible maximum deflection in the measurement of large currents. Two-range instruments are usually provided with a common terminal to which one lead is connected, one terminal for connection of the remaining lead from the circuit in which the current is to be measured for the measurement of large currents, and a third terminal for connection of this lead when currents of lower value are to be measured. The present invention provides a two-range thermocouple instrument which has the convenience of a common terminal and two other terminals for alternate connection, according to whether the current to be measured is high, or low.

Referring to Fig. 5, the common terminal 6 is indicated as in electrical connection with a conducting bar 6a. The terminal 7 is indicated electrically connected to a conducting bar 7a, and may be the terminal to which the external circuit is connected for measurement of low currents; while the terminal 8 is shown connected to a conducting bar 8a, being the terminal to which the external circuit may be connected for the measurement of large currents. Electrically connected between the bars 6a and 7a is a conductor or strip 9 of comparatively small size, which is the heating strip for carrying the current to be measured for currents of low value. Electrically connected between the bars 6a and 8a is another conductor or strip 9a of larger size, or larger current carrying capacity, which is the heating strip for the measurement of currents of larger values, this conductor being indicated by a heavier line than that indicating the conductor 9.

In Fig. 5, one thermocouple of dissimilar metals is indicated by the heavy and light lines 10 and 10a, having their heated joint in thermal relationship to the heating conductor 9, but not electrically connected thereto. That is, the joint of the thermocouple to be heated is in such thermal relationship to the heating conductor 9 that it is quickly responsive to any change in temperature therein. I have found that this thermal relationship and electrical insulation may be accomplished by use of enamel, such as vitreous enamel, which will serve as an insulator of the joint of the couple from the heating conductor with a thin film thereof between the couple and the heating conductor, while at the same time securing the desired intimate conductive heating relationship between the joint of the couple and the heating conductor. In accomplishing this intimate heat relationship while securing electrical insulation, the enamel material is introduced at the junction and fused at the required temperature. This enamel insulation between the joint of the thermocouple and the heating conductor 9 is indicated by the reference character 10b.

Similarly, another thermocouple formed of corresponding conductors having dissimilar metals 11 and 11a, has its joint in thermal relationship to the heating conductor 9a, but electrically insulated therefrom, as indicated by the reference character 11b, indicating enamel insulation between the thermocouple and the heating conductor 9a, while securing thermal relationship by conduction between them. Any other suitable means may be utilized for securing intimate thermal relationship between the joints of the thermocouples and the heating conductors, and which will also serve to insulate the joints of the couples electrically from the heating conductors. If desired, this electrical insulation between one of the thermocouples and its heating conductor may be omitted without impairing the advantageous use of the instrument, even when high frequency currents are to be measured.

The two thermocouples are connected in series with each other, as indicated in Fig. 5, and to terminals 10c and 11c, from which leads extend to the springs 5a, and thence through the coil 5 of the indicating instrument. An adjustable resistance 5c is shown connected in series with the circuit of the movable coil 5 and with the thermocouples for adjustment of the current for securing proper deflection of the movable element, this resistance, of course, remaining fixed after being suitably adjusted. By having the two dissimilar metals of each thermocouple in the same sequence in the instrument circuit as shown and described, the electro-motive force created thereby in the instrument circuit is always in the same direction, giving the same direction of swing of the instrument pointer when a terminal of the external circuit is shifted from terminal 7 to 8, or vice versa, for measurement of currents of different range. Also, it is evident that it will take a larger current through the larger heating conductor 9a to heat it to the same temperature as that attained by the smaller heating conductor upon the passage through the latter of a smaller current. Thus when the instrument is used alternatively for the measurement of comparatively small or large currents, the extent of deflection of the instrument pointer over the double scale depends upon whether the external circuit is connected to terminal 7 or 8.

Between the bar 6a and the terminal 8, an adjustable resistance 12 is connected, although in some cases it may be connected between the bar 6a and terminal 7. This resistance is for the purpose of adjusting the deflection of the movable element of the instrument so that the deflection will be of the same extent when used for measuring the maximum value of current when the instrument is connected to the terminal 7 for low current measurements, as when connected to the terminal 8 for high current measurements, thus giving the same size of scale for reading both high and low current deflections.

In Figs. 1 to 4, the parts corresponding to those already described, are designated by the same reference characters. The common terminal 6 is indicated as passing through the base of the instrument for conveniently receiving connection with the outside circuit in which the current is to be measured; and similarly the alternative terminals 7 and 8 are mounted upon the base 1 and extend at the rear thereof for connection to the outside circuit. I also mount another terminal 6b on the base 1 to which the resistance 12 is connected and which in turn is electrically connected to the bar 6a.

Instead of having the terminals 6, 7, 8 and 6b mounted directly upon the connecting bars or plates to which the heating strips are connected, I have separated the main terminals therefrom and have provided a unitary structure comprising the conducting bars or plates and also the heating elements and thermocouples. And, I have made this unitary structure as a separately removable and replaceable unit for convenience in manufacturing, assembling and repair or replacement of the parts. This separately removable structure comprises a main supporting plate 13 of suitable insulating material, such as bakelite or the like. This insulating plate has mounted thereon the conducting bars 6a, 7a and 8a, which are in the form of metal plates provided with terminals in the form of rings 14 having projections 14a, to which conductors may be connected. These rings are preferably made of copper and are riveted, or otherwise secured, to the metal plates. A pair of similar rings forming the terminals 10c and 11c are mounted upon the insulating plate 13, between which are connected the two thermocouples in series. The two heating conductors 9 and 9a are connected between terminals on the three plates as shown in Figs. 1 and 3. The insulating plate 13 is removably secured to the base 1 by a pair of screws 15.

When this removable unit is mounted in the instrument, the two terminals on the plate 6a are electrically connected by conductors, as indicated in Fig. 1, to the terminals 6 and 6b, respectively. The lower two terminals on the plates 7a and 8a are respectively connected to the terminals 7 and 8. The terminals 10c and 11c are connected in circuit with the movable coil 5 of the instrument. Thus, by merely unsoldering the connections to the terminals carried by the removable unit, the same may be conveniently removed, repaired and adjusted, and when replaced, it is merely necessary to again solder the connections. This removable unit comprising the heating conductors, thermocouples, conducting plates, terminals and main support may be very desirably used in other forms of thermocouple instruments, other than that particularly shown and described herein.

In using the instrument, when the external circuit is connected to the common terminal 6 and the terminal 8 for measurement of currents of comparatively large values, it is apparent that the conductor 9a will then function as the heating conductor and that the thermocouple 11, 11a will create an electro-motive force corresponding to the value of the current to be measured, giving corresponding deflection of the indicating element of the instrument. Similarly, when the external circuit is connected between the terminal 6 and the terminal 7, the conductor 9 functions as the heating element and the thermocouple 10, 10a serves to create an electro-motive force in the instrument circuit corresponding to the current to be measured. It is apparent that when using the instrument, the circuit of the instrument carrying the current causing the deflection, contains no path for the passage of any portion of the current to be measured, and is not subjected to the effects of such current except the heating for the measurement thereof, even though a junction of one of the thermocouples be electrically connected to one of the heating conductors.

Although I have described a preferred embodiment of this invention, it will be understood that modifications thereof may be made without departing from the scope of the invention. It will also be understood that more than two heating conductors may be used and additional thermocouples when desired for instruments having more than two ranges of measurement.

I claim:

1. In an electrical measuring instrument, a plurality of terminals for connection to an external circuit, a heating conductor electrically connected between certain of said terminals, a second heating conductor electrically connected between certain of said terminals, at least one of which is a different terminal from those to which said first heating conductor is connected, said heating conductors being of different current carrying capacity, a thermo-electric device of dissimilar metals having its junction in thermal conductive relationship to said first named heating conductor, a second thermo-electric device of dissimilar metals having its junction in thermal conductive relationship to said second heating conductor, and an indicating device, said thermo-electric devices being connected in the circuit of said indicating device.

2. In an electrical measuring instrument, a plurality of terminals for connection to an external circuit, a heating conductor electrically connected between certain of said terminals, a second heating conductor electrically connected between certain of said terminals, at least one of which is a different terminal from those to which said first heating conductor is connected, said heating conductors being or different current carrying capacity, a shunt connection around one of said heating conductors, a thermo-electric device of dissimilar metals having its junction in thermal conductive relationship to said first named heating conductor, a second thermo-electric device of dissimilar metals having its junction in thermal conductive relationship to said second heating conductor, and an indicating device, said thermo-electric devices being connected in the circuit of said indicating device.

3. In an electrical measuring instrument, a common terminal for connection to an external circuit, a plurality of additional terminals for connection to the external circuit, a heating conductor electrically connected between said common terminal and one of said additional terminals, a second heating conductor electrically connected between said common terminal and another of said additional terminals, a thermo-electric device of dissimilar metals having its junction in thermal conductive relationship to said first named heating conductor, a second thermo-electric device of dissimilar metals having its junction in thermal conductive relationship to said second named heating element, and an indicating device, said thermo-electric devices being connected in series in the circuit of said indicating device, and the dissimilar metals of said two thermo-electric devices at the heating conductors having corresponding sequential relationship in the path of the circuit of said indicating device.

4. An electrical measuring instrument comprising a base and an enclosing casing, a plurality of terminals mounted on said base forming terminals within and without said base, indicating means mounted upon said base, and a separately removable unit mounted upon said base, said unit comprising an insulating support, a plurality of conducting elements mounted on said support, terminals on said elements, and a heating conductor and a thermo-electric device connected between certain of said last named terminals.

5. An electrical measuring instrument comprising a base and an enclosing casing, a plurality of terminals mounted on said base forming terminals within and without said base, indicating means mounted upon said base, said means comprising a magnet and a movable indicating element between the poles of said magnet, and a separately removable unit mounted upon said base within the space encompassed by said magnet, said unit comprising an insulating support, a plurality of conducting elements mounted on said support, terminals on said elements, and a heating conductor and a thermo-electric device connected between certain of said last named terminals.

FRANK W. ROLLER.